A. C. RUTZEN.
SPRING DRIVEN MOTOR.
APPLICATION FILED JULY 6, 1914.

1,178,950.

Patented Apr. 11, 1916.
5 SHEETS—SHEET 1.

ATTEST.

INVENTOR.
A. C. RUTZEN
BY Fisher ATT'YS.

A. C. RUTZEN.
SPRING DRIVEN MOTOR.
APPLICATION FILED JULY 6, 1914.
1,178,950.
Patented Apr. 11, 1916.
5 SHEETS—SHEET 2.
Fig. 2
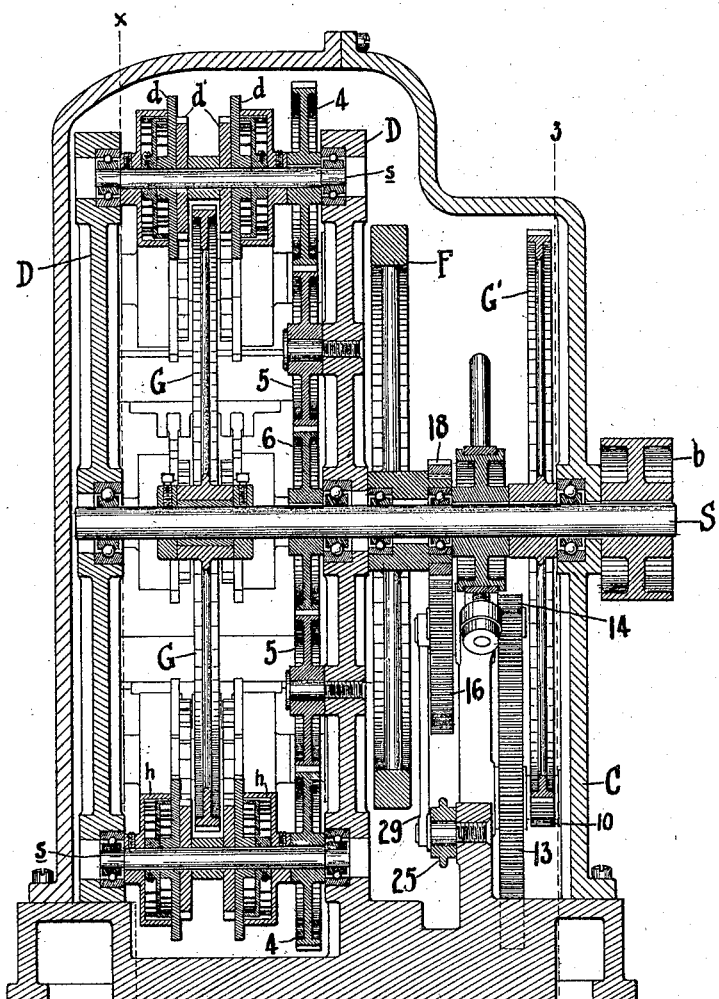
Fig. 2ª
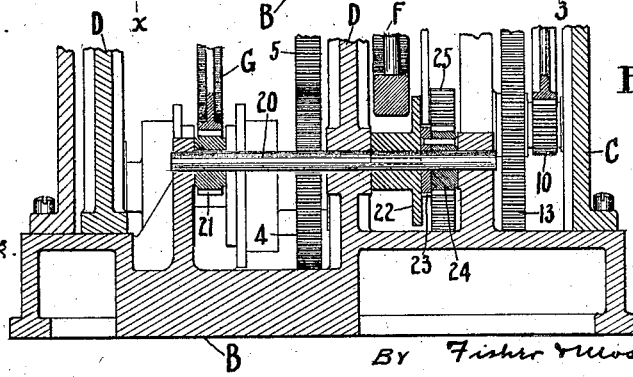
ATTEST
INVENTOR.
A. C. RUTZEN
BY Fisher & ussert ATT'YS

A. C. RUTZEN.
SPRING DRIVEN MOTOR.
APPLICATION FILED JULY 6, 1914.

1,178,950.

Patented Apr. 11, 1916.
5 SHEETS—SHEET 3.

ATTEST.

INVENTOR.
A. C. RUTZEN

BY Fisher ——— ATT'YS.

A. C. RUTZEN.
SPRING DRIVEN MOTOR.
APPLICATION FILED JULY 6, 1914.
1,178,950.
Patented Apr. 11, 1916.
5 SHEETS—SHEET 4.
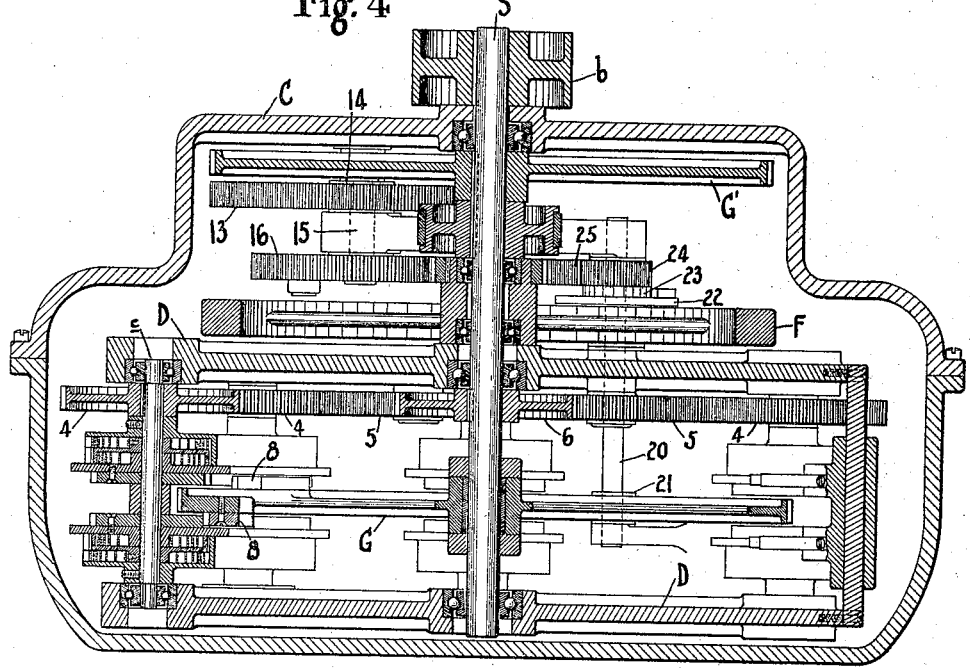
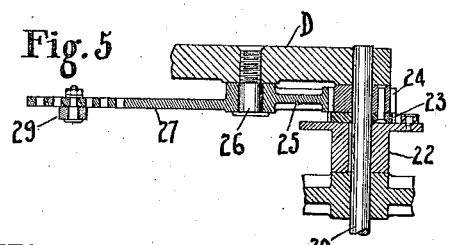
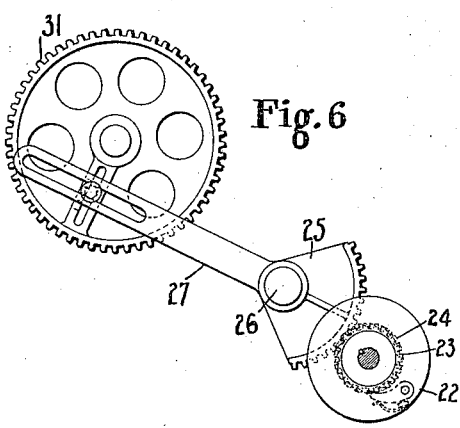
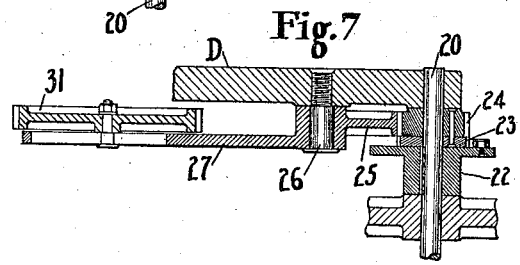
ATTEST
INVENTOR
A. C. RUTZEN.
BY Fisher & Moser
ATT'YS

A. C. RUTZEN.
SPRING DRIVEN MOTOR.
APPLICATION FILED JULY 6, 1914.

1,178,950.

Patented Apr. 11, 1916.
5 SHEETS—SHEET 5.

ATTEST

INVENTOR
A. C. RUTZEN
BY Fisher & Moore ATT'YS

UNITED STATES PATENT OFFICE.

AUGUST C. RUTZEN, OF CLEVELAND, OHIO.

SPRING-DRIVEN MOTOR.

1,178,950.

Specification of Letters Patent. Patented Apr. 11, 1916.

Application filed July 6, 1914. Serial No. 849,232.

*To all whom it may concern:*

Be it known that I, AUGUST C. RUTZEN, a citizen of the United States, residing at Cleveland, in the county of Cuyahoga and State of Ohio, have invented certain new and useful Improvements in Spring-Driven Motors, of which the following is a specification.

This invention appertains to spring driven motors, and the invention consists in a type of motor involving the principles of operation set forth in several other co-pending applications for patents filed by me, the idea in all of said applications being to utilize a fraction of the total energy developed in the machine to automatically re-wind the springs, and the remaining portion of the power for strictly power purposes.

Figure 1:
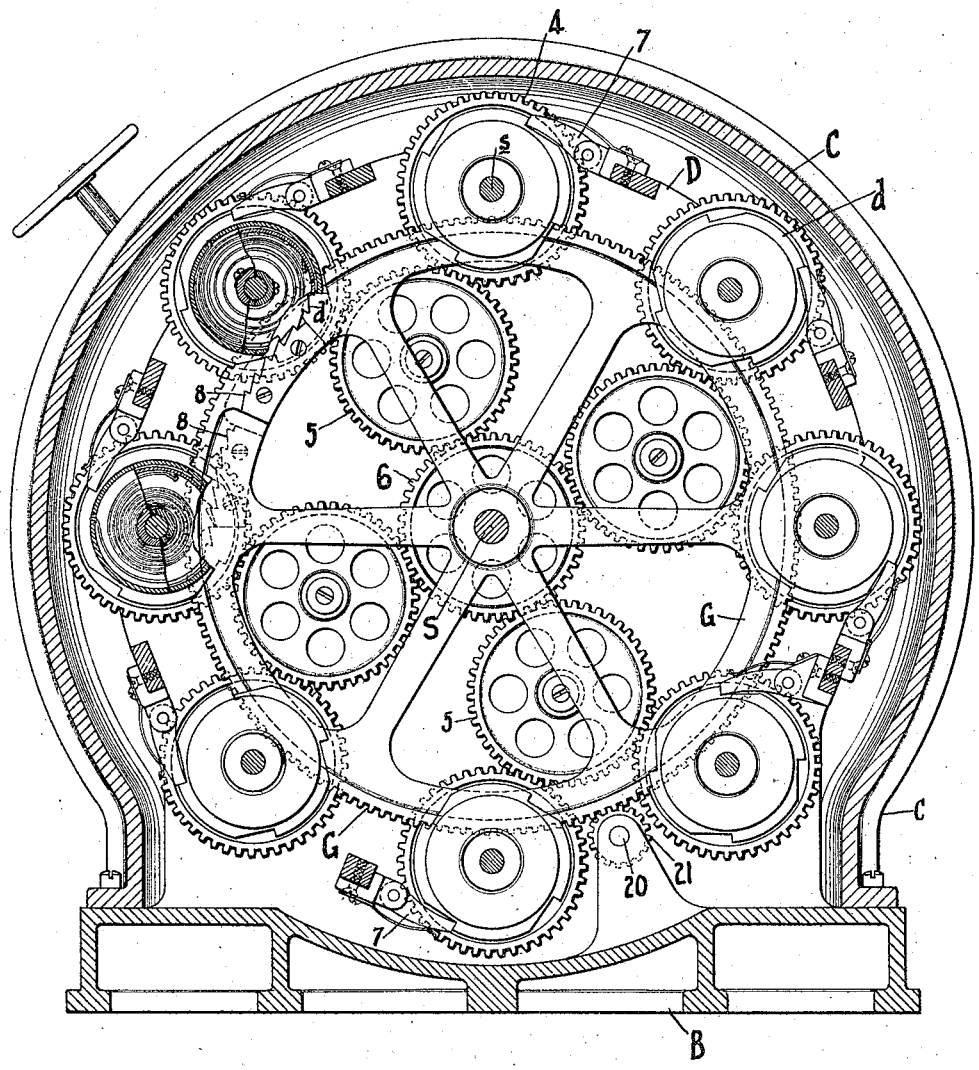
Figure 3:
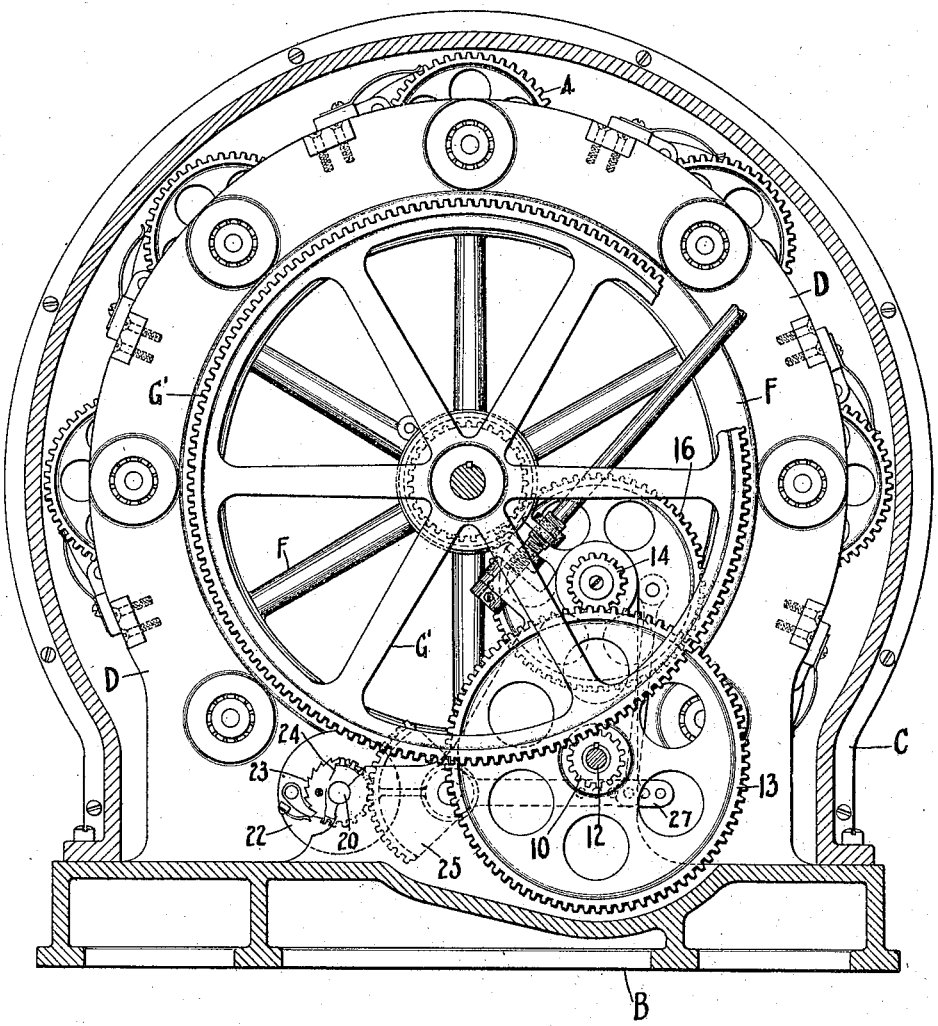
Figure 8:
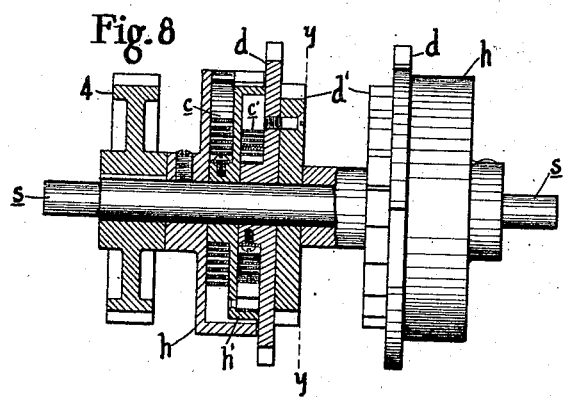
Figure 9:
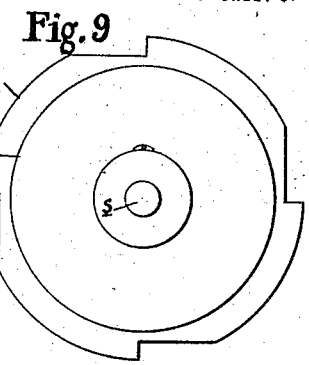
Figure 10:
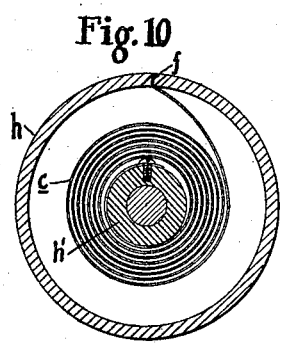
Figure 11:
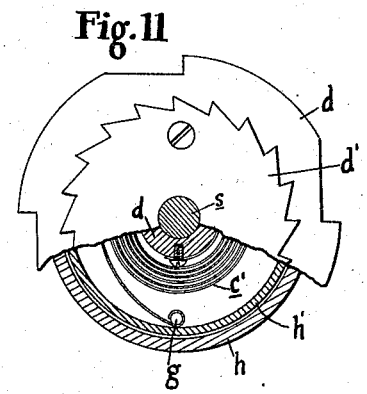
Figure 12:
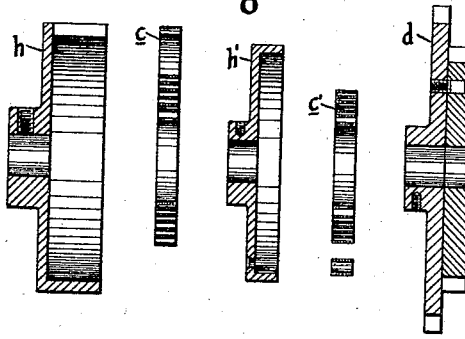
Figure 13:
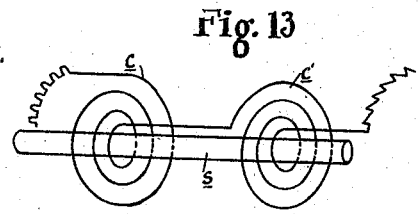

In the accompanying drawings Figure 1 is a sectional elevation of the machine on a line corresponding substantially to $x$—$x$, Fig. 2. Fig. 2 is a vertical cross section on the line of the axis or main shaft of the machine and at right angles to Fig. 1. Fig. 3 is a sectional elevation of the machine on a line corresponding substantially to 3—3, Fig. 2. Fig. 4 is a horizontal plan view on the line of the axis or main shaft and one of the spring shafts. Figs. 5, 6 and 7 are sectional details of portions of the re-winding mechanism as hereinafter described. Fig. 8 is an elevation of one of the spring shafts and parts thereon partially in section; Fig. 9 is an end elevation of Fig. 8. Fig. 10 is a cross section of a spring shaft and the outer spring and housing thereon, and Fig. 11 is a cross section of Fig. 8 on line $y$—$y$, and partially sectional. Fig. 12 represents details of parts shown in Fig. 8 and Fig. 9. Fig. 13 is a diagrammatic view illustrating the working relation of the pairs of springs.

As thus shown B represents the base of the machine and C the casing erected thereon, and which preferably is circular and hermetically closed to be dust proof. In fact all the operating parts are confined within the said casing and base except a single exposed end of the main shaft S from which power is taken through the sheave or pulley $b$ thereon.

The power herein is derived from a series of springs mounted in two pairs on a series of shafts $s$ supported in ball bearings in an internal frame work, D, supported from or rigid with the base B. The said spring shafts $s$ are disposed in a circle about the central shaft S, which in fact is the driven shaft of the machine but is also referred to as the power shaft, since power is taken therefrom for use. The said several spring carrying shafts $s$ have two sets or pairs of springs each mounted thereon as will presently be seen, and said springs are adapted to impart their power to the shafts $s$ and cause them to rotate and convey power to the main shaft S through a series of gears 4, 5, and 6, which, in this instance, are of the same size.

The gears 4 are splined or otherwise affixed to or upon shafts $s$, and two of the said gears on adjacent shafts mesh with or in a single intermediate gear 5 which, in turn, meshes with the single gear 6 on shaft S. The gears 5 are mounted on studs on the interior frame D, and in a sense are idlers but serve to transmit the power from the spring gears 4 to the central gear 6, which rotates shaft S. Thus, there is a graduated reduction in the power transmitting members from the eight primary or spring gears to the four intermediate or idler gears and thence to the single central gear 6.

The power springs or coils $c$ and $c'$ are diagrammatically illustrated in Fig. 13. It has been found that with a single coil of a flat spring of the quality required for this kind of work the total length of the coil at the most cannot be great, and as the spring requires considerable strength there was liable to be more or less excessive strain or shock at the end of the windings, which, if manifested, was deemed objectionable. To relieve these conditions as well as to provide prolonged energy to the spring between windings I have demonstrated herein the practicability of a double or dual coil, one coil being a working part of the other and both working together as one spring.

It will be seen that each spring or coil $c$ and $c'$ has its own housing $h$ and $h'$, the major or outer housing $h$ being fixed by screw or otherwise to the shaft $s$ through the hub thereon to rotate therewith, and the inner or minor housing $h'$ free on said shaft provided with a laterally projecting hub covered by housing $h$ having the inner end of coil $c$ engaged therewith. The outer end of said coil $c$ is fixed at $f$ to the inner periphery of the hub $h$. Coil $c'$ is engaged at $g$ to the inner periphery of the housing $h'$ and at its opposite or inner end of the hub of ratchet disk $d$, which is covered by housing $h'$ and free to rotate on shaft $s$. Pawls 7 engage notches in the winding or take up ratchets $d$, and the ratchet disks $d'$ are affixed to the side of the ratchets $d$ and engaged for limited rotation at stated intervals by the toothed segments 8 spaced evenly apart on the side of the gear wheel G. These details provide for the winding up of the springs with gear G as the actuating medium, and the rotation thus afforded is communicated through the ratchet $d'$ to ratchet $d$ which carries the spring coil $c$ about its hub and has its outer end fixed to the inner periphery of housing $h'$, free on shaft $s$, and having the inner end of coil $c$ fixed to the hub thereof. Hence as the inner coil $c'$ is wound the winding action is directly communicated to the coil $c$ and the winding of both springs or coils proceed uniformly and at the same time. Both the relations of the springs and their practical continuity as one spring serve to avoid any otherwise possible congestion when winding occurs and the shock or strain herein referred to as a not uncommon experience with single and comparatively short stiff springs.

The gear G is free on shaft S and is in driving relation from the fly wheel F as the initial factor in the rewinding operation the said wheel likewise is free on said shaft, the idea being to remove the re-winding as far as practicable from the power shaft and thus reduce or minimize the expenditure of energy for the re-winding of the springs. The fly wheel, of course, is designed to be kept under a high rate of speed and is of such weight and size that it absorbs and does not show the otherwise momentary check which would result from the repeater rewinding operations. The initial step in rewinding is to put energy into the said flywheel, and this is effected through gear wheel G', splined on the opposite end of shaft S from that occupied by gear G, and meshing with a pinion 10 on a short shaft or stud 12, Fig. 3. A gear wheel 13 is fixed on this shaft or stud and meshes with a pinion 14 on another short shaft, 15, which carries gear 16 on its opposite end and meshes with pinion 18 on the hub of the fly wheel and which is free on the said shaft.

Power or momentum from the fly wheel is communicated to the wheel G through pinion 21 on a counter shaft 20, Fig. 1 meshing with said gear G, and said shaft 20, is rotated intermittently or at predetermined intervals by means of a sector 25 pivoted at 26 on the main frame and having a lever or arm 27 which is operatively connected with gear 16, Fig. 5, by means of a link 29. The said link is eccentrically pivoted on the side of gear 16 and adjustable in said arm 27 according to the throw desired for the segment 25, and a modification of this operating connection is seen in Fig. 6 and Fig. 7 wherein the arm 27 is slotted lengthwise at its outer end and has adjustable connection with a controlling gear 31 having a radial slot through which the said arm is adjustably secured. This construction is present in Figs. 6 and 7, and is a modification of Fig. 5, which also agrees with Fig. 7. The distance of rotation of gear wheel G through which re-winding is effected is thus easily controlled. In Fig. 5 the series of perforations through arm 27 serve this purpose.

It will be especially observed that the inner spring $c$ is rotated bodily as the winding of the outer spring proceeds, but the outer spring $c$ is fixed at $f$ on housing $h$ against any rotation, and the power proceeds to shaft $s$ through the housing $h$ fixed thereon and the said connection $f$ from both springs. In other words re-winding occurs through one side at the expenditure of energy through the other side of said springs. The two sets or pairs of springs on the shafts $s$ and the corresponding ratchets $d$ and $d'$ have their complementary segments on opposite sides of the gear wheel G, but adapted to operate at different times or successively so that one or the other pair of springs on the same shaft is wound at a time, but not both at the same time. It may also be noted that it would be possible to carry the winding of the springs to excess, in which case there would be danger of breakage in some portion of the machine. I have, therefore, provided means in the line of mechanism between the fly wheel and the springs to control the tension of the windings, and the said means comprise the segment 25, and the immediately associated parts seen in Figs. 5, 6 and 7, as hereinbefore described.

Respecting the operation of the machine herein described, it should be understood that I do not claim that the machine will run perpetually, nor do I mean to fix any length of time that it will run, because much will depend on the kind and amount of work that is put upon it. However, I do claim that the machine will do useful work for a longer or shorter period, subject to conditions, and that by the kind of springs and their disposition in the machine and the rewinding mechanism substantially as described, the duration of operation is materially prolonged over what would be possible with the same springs without such rewinding mechanism.

What I claim is:

1. In a spring motor, a shaft and two separate spring supports thereon, one of which is fixed to the shaft and the other rotatable, and a spring coil in each support having direct spring connection through the said rotatable support.

2. In a spring motor, a shaft and two spring housings side by side thereon, one of which is fixed and the other rotatable, a ratchet disk operatively related with said rotatable housing and springs in said housing connected up for joint action through said ratchet disk.

3. In a spring motor, a pair of springs and a shaft, a ratchet disk free to rotate on said shaft and having one of said springs affixed thereto at its inner end, and a support for the outer end of the other spring rigid with said shaft.

4. In a spring motor, a shaft and fixed and rotatable housings mounted thereon and a ratchet disk by the side of said rotatable housing, in combination with a spring in each of said housings, the spring in said fixed housing having one end affixed to the hub of the rotatable housing and the spring in said rotatable housing having one end affixed to the hub of said disk, and means to rotate said disk and wind said springs.

5. In a spring motor, a shaft and a pair of springs thereof operatively connected and separate housings to which the outer ends of said springs respectively are attached, a winding ratchet having a hub engaged by the adjacent spring and a hub on the next adjacent housing engaged by the other spring.

6. In a spring motor, a shaft and outer housing having a hub fixed thereon, an inner housing having a hub rotatable on said shaft and a winding up disk having a hub within said inner housing, and a spring in each housing having its outer end fixed to its housing and its inner end fixed to a hub therein, whereby the winding up disk is adapted to wind both springs uniformly.

7. In a spring motor, a shaft, a pair of coiled springs about said shaft and the inner spring free at both ends to be rotated about said shaft and the outer end of the outer spring in fixed relation to the shaft and rotatable therewith, whereby winding of both springs together is possible and the two springs expend their energy in like manner upon said shaft.

8. In a spring motor, a series of springs and re-winding mechanism therefor comprising means to increase or diminish the re-winding distance comprising a sector and pinion in mesh and an arm rigid with said sector adapted to be adjusted to change the throw of said sector.

9. In a spring motor, a series of power springs and means to re-wind the same automatically comprising a fly wheel, ratchet mechanism in connection with each set of springs, a gear wheel adapted to successively engage said ratchet mechanism and to rotate intermittently at predetermined distances, and means between said gear wheel and said fly wheel adapted to lengthen or shorten said distances of rotation according to requirements of the power springs.

10. In a spring actuated motor, a series of power springs and mechanisms therewith to re-wind the same, in combination with a gear wheel adapted to successively operate said mechanisms at predetermined intervals, a fly wheel and means to actuate said gear wheel therefrom comprising adjustable mechanism adapted to change the distance of rotation of the said gear wheel at will and thus determine the measure of re-winding of said springs.

In testimony whereof I affix my signature in presence of two witnesses.

AUGUST C. RUTZEN.

Witnesses:
  F. J. FREER,
  R. B. MOSER.

Copies of this patent may be obtained for five cents each, by addressing the "Commissioner of Patents, Washington, D. C."